April 5, 1955 G. J. SCHOESSOW ET AL 2,705,574

LAMINATED BINDER FOR HANDHOLE CLOSURE FITTING

Filed Aug. 1, 1950

Glen J. Schoessow
Otis R. Carpenter
Nils G. Qvarfordt
INVENTORS

BY J. P. Moran
ATTORNEY

United States Patent Office 2,705,574

Patented Apr. 5, 1955

1

2,705,574

LAMINATED BINDER FOR HANDHOLE CLOSURE FITTING

Glen J. Schoessow and Otis R. Carpenter, Barberton, and Nils G. Qvarfordt, Wadsworth, Ohio, assignors to The Babcock & Wilcox Company, New York, N. Y., a corporation of New Jersey Application August 1, 1950, Serial No. 176,966

2 Claims. (Cl. 220—25)

This invention relates to binders for closure fittings for handholes in pressure vessels, or the like, and more particularly to a novel laminated metal binder capable of assuring adequate sealing pressure of the closure fitting at elevated temperatures and pressures.

Pressure vessels of various types, such as steam or vapor drums and headers, stills, and the like, are provided with handholes for access to connections and component parts. These handholes are arranged to be sealed by a handhole closure fitting which involves, in the usual case, a closure or cover arranged to engage a seating surface on the inside of the vessel around the handhole, a binder arranged for substantial alignment with the closure and designed to engage a seating surface on the outer side of the pressure vessel, and means associated with the closure and binder to draw the closure into tight sealing engagement with its seating surface. The tightness of the closure is not only dependent upon good workmanship in the alignment of the complementary pressure sealing parts but also upon maintenance of the sealing pressures at reasonably constant values. The good workmanship involves the accurate machining of the seating surfaces and of the surfaces of the closure and binder arranged to engage the seating surfaces or a gasket interposed beneath the head of the closure.

The trend toward higher pressures and temperatures in steam generation, including higher superheated steam temperatures, has involved an increasingly difficult problem in maintaining handhole fittings in pressure tight relationship. The problem is particularly acute in the case of cyclical variations in steam temperatures and pressures, as may occur, for example, when a generating unit is shut down and restarted. As a partial solution of the problem involved, handholes and their fittings have been eliminated to the greatest extent in such high pressure and high temperature installations. However, some handholes and closure fittings are necessarily required, or at least highly desirable, so that there is still the problem of attaining a constant tight sealing fit of the closure fittings on such handholes.

The present invention is directed to an improved binder of laminated metal construction. The binder includes a plurality of annular laminae of a metal which has suitable properties for use with cyclically varying temperatures and pressures. For example, the metal of the binder laminae may be a stabilized austenitic material, such as 18–8 stainless steel containing columbium. In accordance with the invention, the seating surfaces for the binder and the closure are machined to be parallel and the closure is provided with a threaded shank extending through a central aperture, in the binder. The outer laminae of the binder has a spherical recess formed around this aperture and which receives a spherical surface on a washer. The other surface of the washer is engaged by a nut threaded on the shank. The spherical interrelationship provides for effective sealing adjustment of the binder and closure as the nut is tightened, despite any irregularities of the seating surfaces.

The outer peripheral portion of the binder has seating engagement throughout its circumference with the outer supporting seating surface of the header. With the tightening force exacted centrally of the binder through the spherically surfaced washer, a cantilever spring action occurs during whatever expansion and contraction may occur in the threaded shank or stud. This action results in firm maintenance of the engagement between the binder and the supporting surface at all times, the spring action being facilitated by the laminated construction of the binder.

As an additional feature, an eye bolt is threaded in the end of the shank whereby the closure fitting may be easily manipulated during the insertion and tightening of the fitting to its handhole sealing relation.

For a better understanding of the principles of the invention, reference is made to the following description of a typical embodiment thereof as illustrated in the accompanying drawings.

Figure 1:
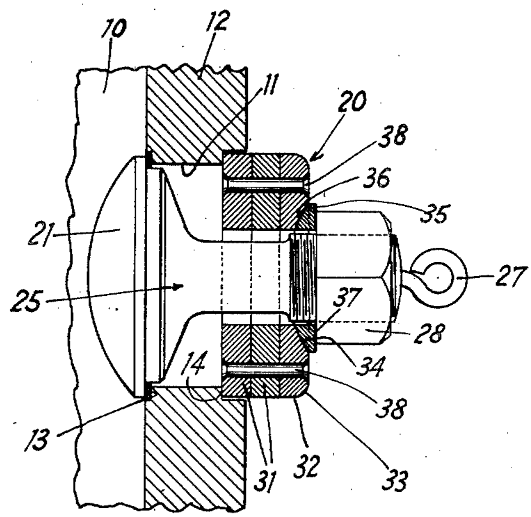
Fig. 1 is a diametrical sectional view through a handhole and a closure fitting there for embodying the invention.
Figure 2:
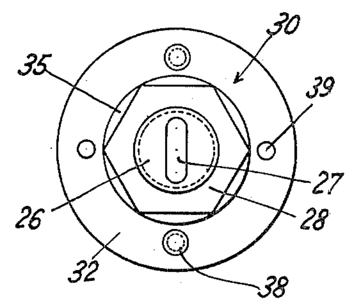
Fig. 2 is an elevation view of the binder and fastening means looking from the right of Fig. 1.
Figure 3:
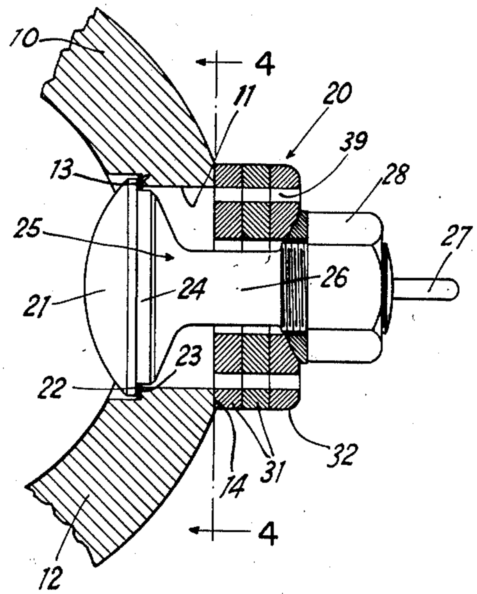
Fig. 3 is a sectional view taken on a diametric plane perpendicular to that of Fig. 1.
Figure 4:
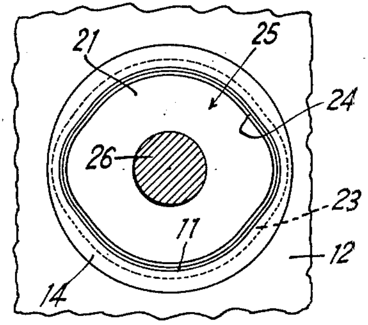
Fig. 4 is a sectional view on the line 4—4 of Fig. 3.

Referring to the drawing, the invention is illustrated as incorporated in a closure for a substantially elliptical handhole 11 formed in the wall 12 of a suitable pressure vessel 10, such as a steam or vapor drum or header. Around the periphery of handhole 11, wall 12 is formed with seating surfaces 13 and 14. These seating surfaces are ground, milled, or otherwise finished to be smooth and parellel to each other.

The handhole closure, generally indicated at 20, includes a substantially elliptical cover 25 having a spherically surfaced head 21 with a minor diameter substantially equal to or a few thousandths of an inch less than the major diameter of handhole 11 so that head 21 may be inserted through the handhole into vessel 10 and then properly oriented relative to the handhole. The peripheral margin 22 of the outer surface of head 21 is finished flat to engage a gasket 23 seated on surface 13, and margin 22 surrounds a boss 24 merging into a threaded shank 26 arranged to extend out through hole 11. The outer end of shank 26 has a central threaded recess to receive an eye bolt 27. Shank 26 is externally threaded to receive a nut 28.

The binder 30, forming the subject matter of this invention, is arranged to fit over shank 26 and seat on surface 14, being held in position by nut 28. As the latter is tightened, cover 25 is drawn firmly against gasket 23 seating on surface 13. Binder 30 is formed of a plurality of annular laminae, such as 31 and 32, three laminae being shown by way of example. However, more than three may be used.

The inner laminae 31 are identical, having flat parallel surfaces. Outer lamina 32 preferably has a rounded outer peripheral edge 33 and a central spherically surfaced recess 34. This recess receives a spherical surface 36 of a washer 35 having an outer flat surface 37 engaged by nut 28. Laminae 31, 32 are united by rivets 38 and may have aligned apertures 39 which act as vents for any pressure fluid leaking past gasket 23.

The several annular laminae are formed of a suitable metal having the proper characteristics for operations at high temperatures and pressures and with cyclically varying temperatures and pressures. The binder 30 bears throughout its circumference against supporting surface 14, being held firmly thereagainst by tightening of nut 28 to firmly engage the spherical surface of washer 35 in the spherically surfaced recess 34. The spherical bearing engagement at the center of the binder provides for a cantilever spring action of the binder as shank 26 expands and contracts with varying temperature. This spring action is facilitated by the laminated construction of the binder, and serves to maintain pressure-tight seating of cover 25 and binder 30. Furthermore, the interaction of the spherical washer surface in the spherical recess results in uniform distribution of the force to the peripheral bearing surface of binder 30.

In installing the handhole closure, cover 25 is inserted through handhole 11 with its narrower dimension aligned with the longer dimension of the handhole, gasket 23 previously having been placed in position on the cover. Binder 20 and washer 35 are then slipped over shank 26 and nut 28 given a few turns along the shank. During this manipulation, eye bolt 27 is used to hold the fitting either manually or with a suitable support. The eye bolt may then be used to turn cover 25 into proper alignment with its seating surface, and to pull the cover outwardly so that gasket 23 seats against surface 13. Nut 28 is then tightened to draw the cover and binder toward each other, resulting in firm sealing fitting of these two members on their seating surfaces.

While a specific embodiment of the invention has been described in detail to illustrate the application of the invention principles, it should be understood that the invention may be otherwise embodied without departing from such principles.

We claim:

1. For use with a closure fitting sealingly cooperable with a peripheral seat around the inner end of an access opening in a pressure vessel operating under cyclically varying elevated temperatures and pressures, the fitting having a central, threaded stem extending outwardly through the opening when the fitting is in place; a binder cooperable with the fitting and comprising a plurality of superposed, substantially congruent annular laminae and circumferentially spaced securing means each extending through all the laminae securing the laminae in tightly superposed relation and forming a composite multilaminar unit arranged to permit the fitting stem to project therethrough when the peripheral portion of the inner face of the unit is in engagement with a peripheral seat around the outer end of the access opening; the outer face of the unit having a central and coaxial spherical recess therein forming a seat for the spherical inner surface of a washer having a flat outer surface engageable by a nut threaded onto the stem of the fitting to draw the latter into such sealing cooperation with its seat with the binder acting in the nature of a multi-leaved cantilever spring; the laminae having aligned vent openings formed therethrough inwardly of their outer peripheries; each of said laminae being formed of a metal resistant to stresses induced by cyclically varying elevated temperatures and pressures.

2. A binder as claimed in claim 1 in which each of said laminae is formed of an austenitic alloy steel resistant to stresses induced by cyclically varying elevated temperatures and pressures.

References Cited in the file of this patent

UNITED STATES PATENTS

| | | |
|---|---|---|
| 104,759 | Neill | June 28, 1870 |
| 701,691 | Engelhardt | June 3, 1902 |
| 1,006,263 | O'Leary | Oct. 17, 1911 |
| 1,239,026 | Meier | Sept. 4, 1917 |
| 1,352,254 | Emerson | Sept. 7, 1920 |
| 1,526,263 | Wilson | Feb. 10, 1925 |
| 1,560,280 | Martin | Nov. 3, 1925 |
| 1,734,343 | Prentice | Nov. 5, 1929 |
| 2,367,909 | Wanner | Jan. 23, 1945 |

FOREIGN PATENTS

| | | |
|---|---|---|
| 625,560 | France | Apr. 25, 1927 |
| 310,852 | Great Britain | Aug. 1, 1930 |